(12) United States Patent
Fong et al.

(10) Patent No.: US 8,156,479 B2
(45) Date of Patent: Apr. 10, 2012

(54) SYSTEM AND METHOD OF MONITORING DYNAMIC SCOPES IN SYNCHRONOUS AND ASYNCHRONOUS CALLS

(75) Inventors: Pamela H. Fong, East Palo Alto, CA (US); Chendong Zou, Cupertino, CA (US); Robert C. Chen, San Mateo, CA (US); Edwin V. Sapugay, San Mateo, CA (US)

(73) Assignee: International Business Machines Corporation, Armonk, NY (US)

( * ) Notice: Subject to any disclaimer, the term of this patent is extended or adjusted under 35 U.S.C. 154(b) by 1158 days.

(21) Appl. No.: 11/952,129

(22) Filed: Dec. 7, 2007

(65) Prior Publication Data

US 2009/0150869 A1 Jun. 11, 2009

(51) Int. Cl.
*G06F 9/44* (2006.01)
(52) U.S. Cl. ........................................................ 717/133
(58) Field of Classification Search ........................ None
See application file for complete search history.

(56) References Cited

U.S. PATENT DOCUMENTS

| | | | |
|---|---|---|---|
| 6,012,059 A | 1/2000 | Neimat et al. | |
| 6,317,773 B1 | 11/2001 | Cobb et al. | |
| 6,804,627 B1 * | 10/2004 | Marokhovsky et al. | 702/182 |
| 2003/0200212 A1 * | 10/2003 | Benson et al. | 707/7 |
| 2004/0172638 A1 | 9/2004 | Larus et al. | |
| 2006/0173951 A1 * | 8/2006 | Arteaga et al. | 709/203 |

OTHER PUBLICATIONS

Lowy, Juval. "Introducing System.Transaction in the .NET Framework 2.0." Published Dec. 2005. http://msdn.microsoft.com/en-us/library/ms973865.aspx.*

* cited by examiner

*Primary Examiner* — Anna Deng
*Assistant Examiner* — Adam R Banes
(74) *Attorney, Agent, or Firm* — Samuel K. Simpson Patent Ingenuity, P.C.

(57) ABSTRACT

A system and method for monitoring dynamic scopes in a runtime environment is disclosed. The system and method utilizes an algorithm which may be applied to both synchronous and asynchronous invocations. The method comprises determining an initial scope of a source component, the initial scope being a scope of the source component upon providing a synchronous call to invoke a target component. The scope declaration specified by the target component is determined. A resultant scope present upon invocation of the target component is then determined. The resultant scope is determined based on the initial scope of the source component and the scope declaration specified by the target component. A record is stored in a centralized location identifying the resultant scope, and the target component as a participant in the resultant scope.

23 Claims, 11 Drawing Sheets

SYSTEM AND METHOD OF MONITORING DYNAMIC SCOPES IN SYNCHRONOUS AND ASYNCHRONOUS CALLS

BACKGROUND

1. Field

This disclosure relates to monitoring scopes in a runtime environment. More specifically, the disclosure relates to a generic process that monitors dynamic scopes over synchronous and asynchronous invocations.

2. General Background

In computer programming, a scope is an enclosing context where values and expressions are associated. Various programming languages have various types of scopes. The type of scope determines what kind of entities the programming language can contain and how it affects those entities or semantics. For example, scopes can contain declarations or definitions of identifiers. Scopes can contain statements and/or expressions which define an executable algorithm or part thereof. Scopes can further nest or be nested. Variables, functions, and classes can all have scopes.

One of the basic reasons for scoping is to keep variables in different parts of a program distinct from one another. Since there are only a small number of short variable names, and programmers share habits about the naming of variables (e.g., "i" for an array index), in any program of moderate size the same variable name will be used in multiple different scopes. The question of how to match various variable occurrences to the appropriate binding sites is generally answered in one of two ways: static scoping and dynamic scoping.

With static scope, a variable always refers to its nearest enclosing binding site. This is a property of the program text and unrelated to the runtime call stack. Because matching a variable to its binding only requires analysis of the program text, this type of scoping is sometimes also called lexical scoping.

With dynamic scope, each identifier has a global stack of bindings. Introducing a local variable with name x pushes a binding onto the global x stack (which may have been empty), which is popped off when the control flow leaves the scope. Evaluating x in any context always yields the top binding. In other words, a global identifier refers to the identifier associated with the most recent environment. This cannot be completed at compile time because the binding stack only exists at runtime, which is why this type of scoping is called dynamic scoping.

A widely known dynamic scope mechanism is found in the Java 2 Platform Enterprise Edition ("J2EE"), in which a target component upon invocation can join, leave, or suspend the existing scope. However, this scope mechanism, along with the corresponding implementation, is limited to synchronous invocations only.

Business Integration (BI) software products, such as the IBM CrossWorlds system and WebSphere Business Integration (WBI) system, provide mechanisms for two or more third party products to communicate and collaborate with each other. The WBI component model encapsulates both synchronous and asynchronous invocations into a unified model. However there is currently no method of tracking dynamic scopes in a component model which applies to both synchronous and asynchronous invocations.

SUMMARY

In one aspect, a method for tracking dynamic scopes is disclosed. The method comprises detecting a call from a source component to invoke a target component and determining an initial scope of the source component. The scope declaration specified by the target component is also determined. A resultant scope present upon invocation of the target component is then determined. The resultant scope is determined based on the initial scope of the source component and the scope declaration specified by the target component. A record is stored in a centralized location identifying the resultant scope, and the target component as a participant in the resultant scope.

In another aspect, a method for tracking dynamic scope in a synchronous call is disclosed. The method comprises detecting a synchronous call from a source component to invoke a target component and determining an initial scope of the source component. The initial scope is the scope of the source component prior to invocation of the target component. The scope declaration specified by the target component is then determined. A resultant scope present upon invocation of the target component is then determined. The resultant scope is determined based on the initial scope of the source component and the scope declaration specified by the target component. If it is determined that the resultant scope is a scope different from the initial scope, a new scope is created. A database record is created identifying the new scope and the target component as a participant in the new scope. If it is determined that the resultant scope is the same as the initial scope, the target component joins the initial scope. A database record is then created identifying the target component as a participant in the initial scope.

In another aspect, a method for tracking dynamics scopes in an asynchronous invocation is disclosed. The method comprises detecting an asynchronous call from a source component to invoke a target component and intercepting the asynchronous call at a first interception point. The first interception point is prior to an asynchronous handoff. The initial scope of the source component is determined, the initial scope being a scope associated with the source component prior to invocation of the target component. If the initial scope is determined not to be null, a record is stored in a centralized location identifying the initial scope, and the target component as a phantom participant in the initial scope upon determining. The asynchronous call is then intercepted at a second interception point, the second interception point being after the asynchronous handoff and prior to invocation of the target component. Data is analyzed at the second interception point to determine the scope declaration specified by the target component. A resultant scope present upon invocation of the target component is now determined. The resultant scope is determined based on the scope of the source component and the scope declaration specified by the target component. A subsequent record identifying the resultant scope, and the target component as a participant in the resultant scope is created. The record identifying the target component as a phantom participant in the initial scope is now removed. A return call from the target component to the source component is intercepted after invocation of the target component has completed. The subsequent record is now updated to indicate the target component is no longer a participant in the resultant scope.

In another aspect, a system for tracking dynamic scopes for synchronous and asynchronous calls is disclosed. The system comprises a scope tracking database configured to store information regarding a scope and a component participating in the scope. The system also comprises a scope tracking module. The scope tracking module is configured to intercept a call from a source component in an initial scope to invoke a target component. The scope tracking module determines a resultant scope present upon invocation of the target component. The resultant scope is determined based upon the initial scope of the source component and a scope declaration specified by the target component. The scope tracking module is further configured to insert data identifying the resultant scope and the target component participating in the resultant scope into a record in the scope tracking database.

According to another aspect of the present disclosure, there is also provided a computer executable program for executing steps of the above method, a machine readable storage medium with codes of the computer executable program stored thereon, and a computer program product with codes of the computer program encoded thereon.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

A system and method for monitoring dynamic scopes in a runtime environment is disclosed. The system and method utilizes an algorithm which may be applied to both synchronous and asynchronous invocations.

A WBI scope is defined as a set of components that are involved in an execution path that one wishes to apply certain quality-of-service such as Event Sequencing or Isolation Service. As an example, a WBI scope is identified by a triplet represented by a source, destination, and key object value. The source refers to the source component that is trying to enter a scope. The destination is the component name, interface name, or method name of the target component. The key object is any object that has a known object type and object key can become a key object.

With respect to WBI scope declarations, there are some basic operations that a participant can perform. For example, an execution thread may start a new scope, join an existing scope, leave a scope, or end a scope. The following attributes are used to represent such behaviors, and to define a scope.

For example, one type of scope declaration is the "Required" attribute. A scope declaration of Required specifies that if a component is not part of a current scope, a new scope should be initiated. If there is an existing scope, the component should join the existing scope. Another type of scope declaration may specify that the scope is "Supported." In this case, the component joins an existing scope if there is one. If there is no existing scope, no action is taken. A "Chained" scope indicates that if there is an existing scope, the component should stop participating in the existing scope, and start a new scope. A scope defined with attribute "RequiresNew" always starts a new scope. If there is already an existing scope, then a new nested scope is started. A scope defined with attribute "NotSupported" specifies that the component is to stop participating in the current scope. This tag is often used to end the boundary of an Event Sequencing scope.

Given the above definitions, scopes can be formed dynamically during runtime based on the scope attributes set at each of the components. A generic scope mechanism as such is useful in providing a variety of quality-of-services. One example is the Event Sequencing service.

Figure 1:
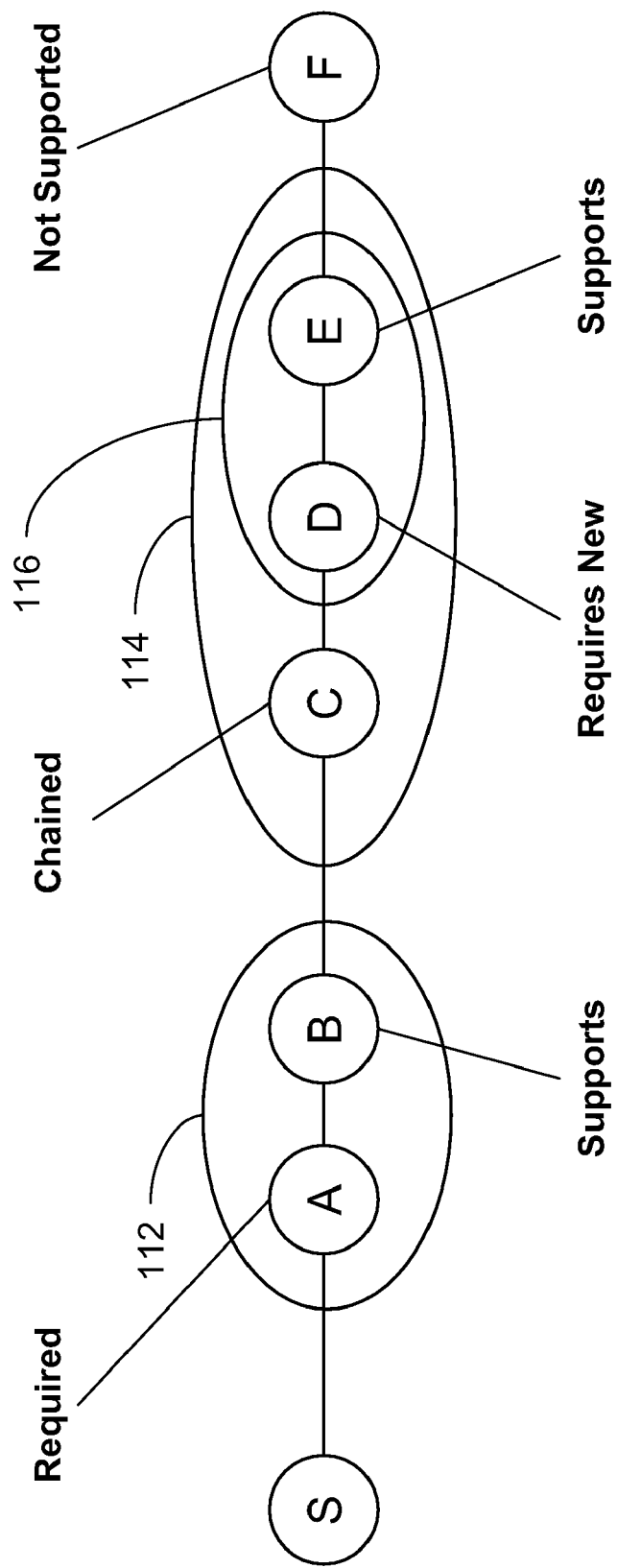
FIG. 1 illustrates examples of the behavior exhibited by the different types of scope declarations that may be specified by a component.

FIG. 1 illustrates examples of each of the types of scope attributes or behaviors discussed thus far. Components are shown as circles labeled with the letters S, A, B, C, D, E, and F. Scopes are represented by ovals which encompass various components. A component participating in a scope is represented by the circular component being surrounded by an oval.

The components shown in FIG. 1 illustrate a series of calls or invocations from one component to the next over time, and the resulting scopes. Component S initially invokes, or makes a call to component A. Component A is a component having a scope defined with the attribute "Required." As discussed above, the required attribute indicates that a new scope should be created if there is no initial scope. Therefore, a new scope 112, as indicated by the oval encompassing component A, is started.

Component A can make a call to invoke component B. Component B has a scope declaration of the type Supports. As discussed above, the Supports attribute specifies that the component should join the existing scope if there is one. Because component A is already within scope 112, component B joins existing scope 112.

Now consider component B makes a call to invoke component C. Component C has a scope defined by the Chained attribute. The Chained attribute requires that the component should leave an existing scope and start a new scope. Component B is currently within scope 112. Therefore, a new scope 114 is started.

Component C now makes a call to invoke component D. Component D has a scope declaration of type RequiresNew, which as mentioned above, requires that the component start a new scope, and in particular, that the scope should be a nested scope if a scope already exists. Therefore, a new scope 116 is created, nested within already existing scope 114. It should be noted that a nested scope has a parent/child relationship with the scope it is nested within. In one aspect, the child or nested scope has a pointer to its parent scope, and the parent scope keeps a list of its children, or nested scopes.

A call is now made from component D to component E. Component E has a scope declaration of type Supports. By definition, the Supports attribute requires that the component participate in the existing scope if there is an existing scope. Therefore, component E joins scope 116, which was previously created by component D. Finally, a call is made from component E to invoke component F. Component F has a scope which is defined by the NotSupported attribute. As mentioned above, the NotSupported attribute indicates that the component should leave the current scope. Component F therefore leaves the current scope 116 and is shown as no longer participating in any scope.

Each of the scope attributes discussed thus far provide rules for determining scope based on the status of initial scope of the source component. Therefore, if the initial scope of the source component and the type of scope declaration specified by the target component are known, the resultant scope upon invocation of the target can be determined.

Figure 2:
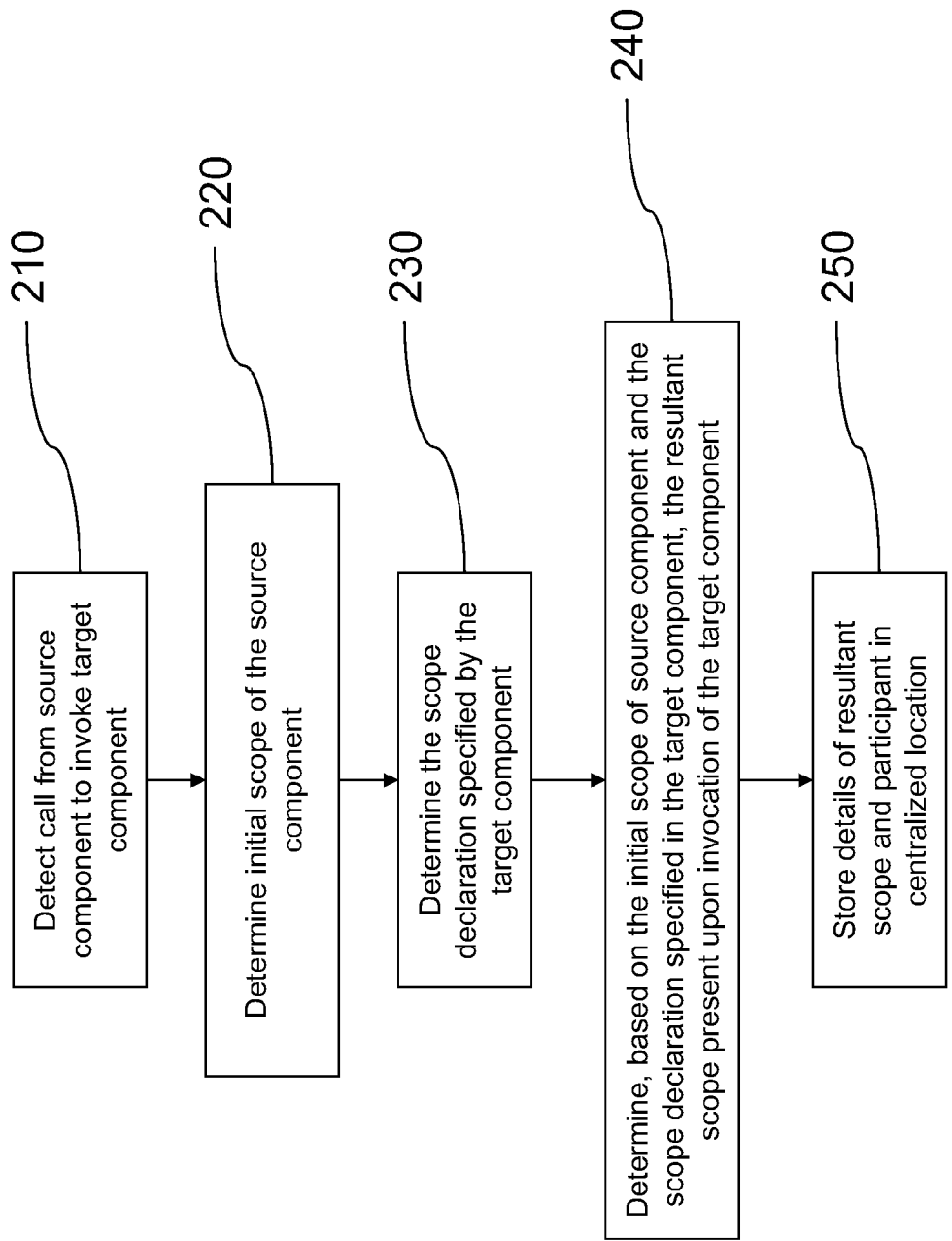
FIG. 2 is a block flow diagram of a method for monitoring scopes.

The basic steps involved in an algorithm used to track dynamic scopes in a runtime environment is illustrated in the block flow diagram of FIG. 2. Consider a call is made from a source component to invoke a target component. At initial step 210, the call from the source component to the target component is detected. A determination is made at step 220 of the initial scope of the source component. The initial scope may be null, meaning that the source component is not within any scope. Alternatively, the initial scope may have a value, indicating that the source component is currently within a scope. A determination is then made, as indicated at step 230, of the scope declaration specified by the target component. The scope declaration is for example one of the types discussed above: Required, Supports, Chained, RequiresNew, or NotSupported. A determination can then be made at step 240, based on the initial scope of the source component, and the scope declaration specified by the target component, what the resultant scope will be upon invocation of the target component. Details of the resultant scope are then stored in a centralized location, such as a database. Each time a call is made to invoke a component, details regarding the scopes in play, and their participants, are stored or recorded in a centralized location, as indicated at step 250. Therefore, a comprehensive view of all the active scopes present as well as the participants at any point in time in a runtime environment is provided.

A call to invoke a component may be a synchronous call or an asynchronous call. A synchronous call or invocation is generally one in which the source awaits a response or return call from the target. In one aspect, a synchronous invocation involves a single threaded process. Asynchronous operation means that a process operates independently of other processes, whereas synchronous operation means that the process runs only as a result of some other process being completed or handing off operation. In this case, asynchronous operation may mean that the execution path is multi-threaded. An asynchronous call initially is sent to some sort of asynchronous storage, where the call is queued, and later executes in a separate thread.

The determination of the initial scope of the source component (step 220) generally involves intercepting the call made from the source component to the target component, and analyzing the call context to determine whether or not the source component is within a scope. Similarly, the determination of the scope declaration specified by the target component (step 230) generally involves intercepting the call made from the source component to the target component and analyzing the call context to determine what scope attribute the target component is defined by.

The scope tracking algorithm of the present disclosure may be applied to both synchronous and asynchronous invocations. For synchronous invocations, a call interception occurs just before the target component is invoked. This interception point is called "pre-invoke". The initial scope of the source component and the scope declaration specified by the target component can be determined from intercepting the call at pre-invoke.

The scope attributes of each component is only available from its corresponding runtime context. For example, if source component A calls target component B synchronously, both are executed in the same thread. Therefore, source component A can see target component B's scope attributes (during pre-invoke). However, if the call is made asynchronously, source component A and target component B are likely to be executed in different threads, or even different virtual machines or physical machines. For an asynchronous call, source component A cannot see target component B's scope attributes (i.e. during pre-dispatch) because a thread switch occurs. Therefore, the call from the source component is first intercepted just before being delivered to asynchronous storage, such as a Java Message Service (JMS) queue. This interception point is called "pre-dispatch". The initial scope of the source component is determined from intercepting the call from the source component at pre-dispatch. A second interception is then made at pre-invoke, after the thread switch has occurred. The scope declaration specified by the target component is determined by analyzing the call context at the pre-invoke interception point.

Therefore, the scope tracking algorithm involves only two interception points for synchronous invocations, and three interception points for asynchronous invocations. For synchronous invocations, a call interception occurs prior to invocation of the target component, and after invocation of the target component has completed. These interception points are called "pre-invoke" and "post-invoke", respectively. For asynchronous invocations, the first call interception occurs prior to being delivered to asynchronous storage. The second and third interception points are the same as the synchronous invocation case.

The scope tracking algorithm is a distributed algorithm that handles the state transitions between a source component and a target component during an invocation. The algorithm for scope tracking is discussed in further detail with reference to various exemplary scenarios as follows.

Figure 3A:
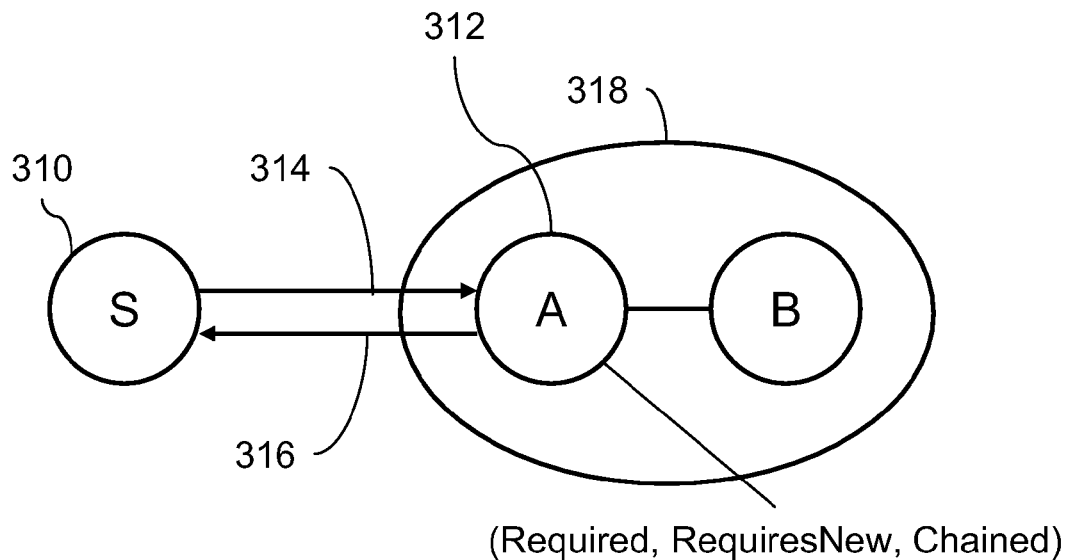
FIG. 3A illustrates a situation where a source component is initially not in any scope, and makes a synchronous call to invoke a target component having a scope declaration of type Required, RequiresNew, or Chained.
Figure 3B:
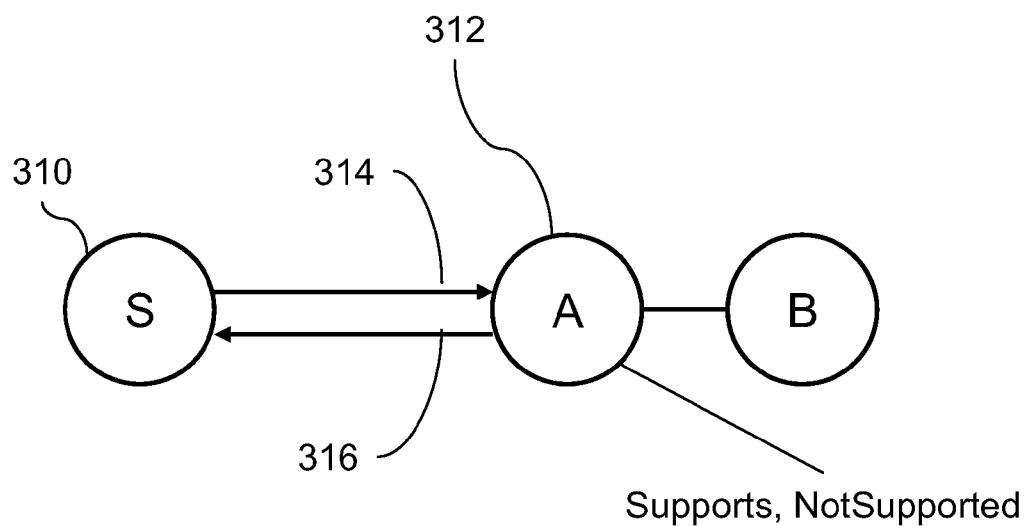
FIG. 3B illustrates a situation where a source component is initially not in any scope, and makes a synchronous call to invoke a target component having a scope declaration of type Supports or NotSupported.

FIGS. 3A-3D illustrate example scenarios for determining and tracking scopes in synchronous calls. FIGS. 3A and 3B illustrate scenarios in which a caller, or source component 310, is not initially in any scope. In the scenario illustrated in FIG. 3a, the target component 312 has a scope declaration of Required, RequiresNew, or Chained. In FIG. 3B, the target component 312 has a scope declaration of Supports or NotSupported.

The source component 310 makes a call to invoke a target component 312. The call to the target component 312, prior to the target component being invoked, is intercepted. This interception point 314 is called "pre-invoke." An interception also occurs just after the target component 312 is invoked, and this interception point 316 is called "post-invoke."

By intercepting the call, one can retrieve information such as whether or not the source component 310 is currently in a scope, and the scope declaration of the target component 312. Based on the current scope of the source component 310 (whether or not the source component is in a scope) and the scope declaration specified by the target component 312, one can determine whether or not a new scope will be created.

Therefore, as illustrated in FIG. 3A, at pre-invoke 314 the call is intercepted. The call context is analyzed to determine if the source component 310 is currently in a scope, or if there is no scope. Further, the call context is analyzed to determine what the scope declaration the target component 312 has specified. In the case illustrated in FIG. 3A, it is determined that the source component 310 is not in any scope, and the scope declaration of the target component 312 is of a type Required, RequiresNew, or Chained. As discussed above, scope declarations of type Required, RequiresNew, or Chained require that a new scope be started. Therefore, it can easily be determined that a new scope 318 should be created upon invocation of the target component 312.

The present disclosure provides a system and method for tracking scopes and scope participants. Therefore, each time a new scope is created, a record is also created to indicate the presence of that new scope. In one aspect, a scope tracking database is used to record information about scopes and the scope participants. For example, in one embodiment, each time a new scope is created, an entry in a database is created. The database entry may comprise a scope ID which identifies the scope, and further identifies the components participating in the scope. Furthermore, each time a component joins or leaves a scope, an entry or update is made to the database to indicate the change in scope participants. Therefore, a full view of how many active scopes there are as well as which components are participants can be created.

Referring back to FIG. 3A, new scope 318 is created. A database entry is then created to indicate the presence of new scope 318, and target component 312 as a participant within scope 318. The target component 312 executes, and upon completion, execution is returned to the source component 310. The return call is intercepted at post-invoke interception point 316. Target component 312 is removed from scope 318. A check is now performed to determine if scope 318 is empty. A scope is considered to be empty if it has no participants. Scopes that are detected as empty are removed. Scopes are created dynamically at runtime, and therefore must be cleaned up dynamically during runtime to avoid memory leaks. The scope tracking database is therefore queried to determine if there are any components listed as participants in scope 318. Finally, if scope 318 is determined to be empty, scope 318 is removed.

FIG. 3B illustrates an example of a source component 310 not in a scope which invokes a target component 312 having a scope declaration of type Supports or NotSupported. As defined above, a target component 312 having a scope declaration of type Supports or NotSupported does not cause a new scope to be created when there is no initial scope. Therefore, there is no change in scope. As a result, in one aspect, no entry is created in the scope tracking database to record details of the scope because there is no scope.

Figure 3C:
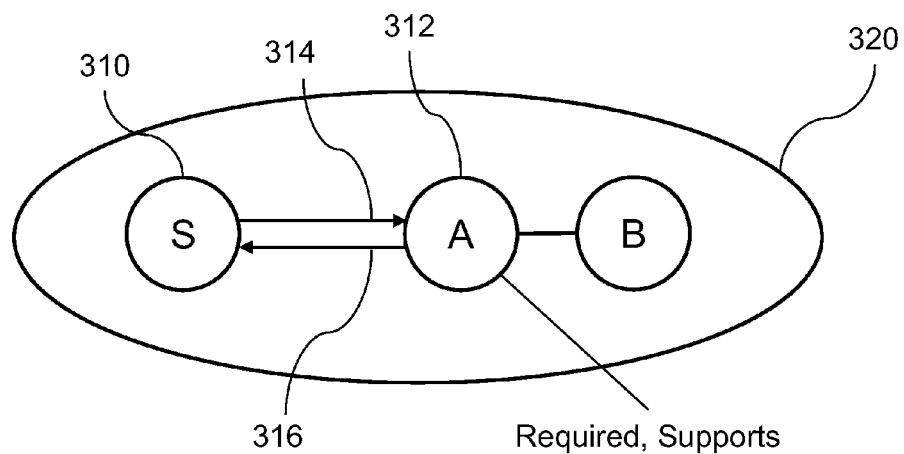
FIG. 3C illustrates a situation where a source component is initially in a scope, and makes a synchronous call to invoke a target component having a scope declaration of type Required or Supports.

FIG. 3C illustrates an example of a synchronous call from a source component 310 that is already in a scope 320, to a target component 312 having a scope declaration of type Required or Supports. Scopes of type Required or Supports participate in the existing scope if there is one. Therefore, target component 312 joins the existing scope 320. The scope tracking database is updated to include target component 312 as being a participant in scope 320. After the target component 312 has executed, execution is returned to the source component 310. The return call from the target component 312 to the source component 310 indicates that execution of the target component 312 is complete. Therefore, target component 312 can be removed from scope 320. At this post-invoke interception point 316, the return call is intercepted. An update is made to the scope tracking database to indicate that the target component 312 is no longer a participant in scope 320. The scope tracking database is queried to determine if scope 320 has any participants, or if it is now empty. If there are no components listed as participants in scope 320, scope 320 is removed.

Figure 3D:
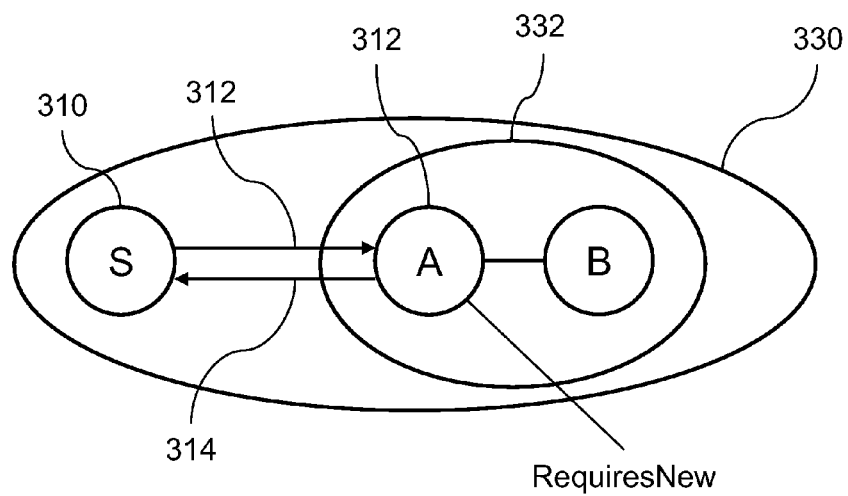
FIG. 3D illustrates a situation where a source component is initially in a scope, and makes a synchronous call to invoke a target component having a scope declaration of type RequiresNew.

FIG. 3D illustrates an example of a synchronous call from a source component 310 that is already in a scope 330, to a target component 312 having a scope declaration of type RequiresNew. A scope declaration of type RequiresNew requires that a new scope be created. In the case where there is already an existing scope, a nested scope is created. The call from the source component 310 to the target component 312 is intercepted at pre-invoke 314. The call context is analyzed to determine if the source component 310 is currently in a scope. In the example shown in FIG. 4, the pre-invoke data indicates that the source component 310 is already within scope 330. The call context at pre-invoke is also analyzed to determine what scope declaration is specified by the target component 312. In this case, the target component 312 has a scope declaration of type RequiresNew. As a result, a new nested scope 332 is created. A record is created in the scope tracking database to indicate that new scope 332 has been created, and that target component 312 is a participant of scope 332. The target component 312 then executes. Once the target component 312 has completed execution, execution is returned to the source component 310. A return call from the target component 312 to the source component 310 is intercepted at post-invoke interception point 316. An update is made to the scope tracking database to indicate that target component 312 has left scope 332. Next, the scope tracking database is queried to determine if scope 332 is empty. If scope 332 is determined to be empty (no participants), it is removed. However, when a nested scope is removed, the parent scope is notified. As mentioned above, a nested scope contains a pointer to its parent. Therefore, nested scope 332 has a pointer which indicates its parent scope 330. Therefore, the scope tracking database is queried again to determine if parent scope 330 is empty. If the parent scope 330 is empty, it is removed too.

Scopes of type Chained and NotSupported are not described in reference to synchronous calls because they are not applicable to synchronous calls or invocations.

Figure 4A:
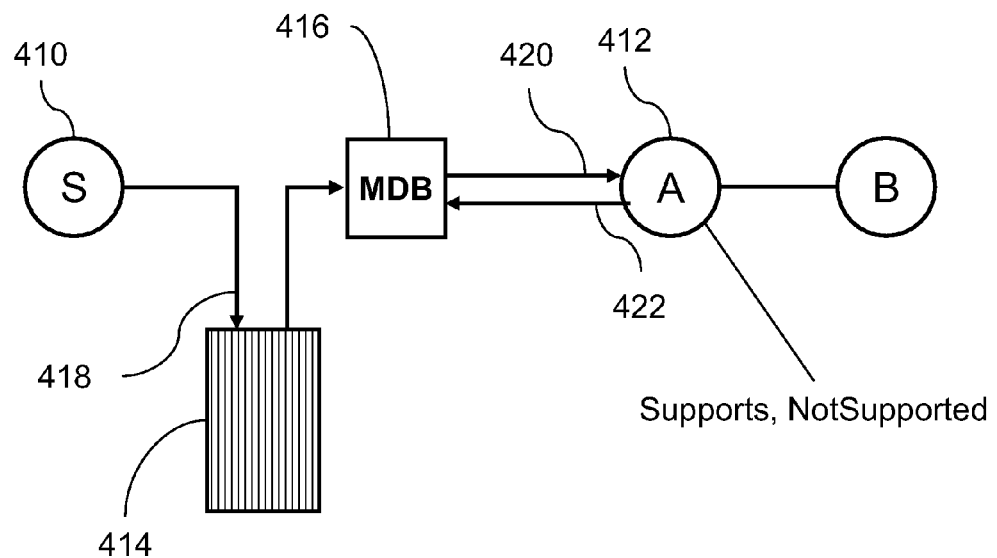
FIG. 4A illustrates a situation where a source component is initially not in any scope, and makes an asynchronous call to invoke a target component having a scope declaration of type Supports or NotSupported.

FIG. 4A illustrates an example of an asynchronous call from a source component 410 not in any scope, to a target component 412 having a scope declaration of type Supports or NotSupported. Source component 410 makes an asynchronous call to invoke target component 412. Because the call is an asynchronous call, the call is first delivered to asynchronous storage 414 where it waits in a queue.

The Java Messaging Service (JMS) is a core service provided by J2EE application servers. It allows services to be invoked asynchronously via messages (e.g., email or IM messages). The server can re-route messages to avoid traffic peaks and respond to service requests based on service-level agreements. As a result, JMS is suitable for implementing highly scalable and reliable enterprise systems.

The JMS clients send messages to message queues managed by the server (e.g., an email inbox can be a message queue). The message queues are monitored by a special kind of Enterprise JavaBeans (EJBs)—Message Driven Beans (MDBs). The MDB processes the incoming messages and perform the services requested by the message. The MDBs are the end-point for JMS service request messages.

Therefore, in FIG. 4A, MDB 416 is configured to monitor JMS queue 414. When the JMS queue 414 receives a message, the MDB 416 processes the message and forwards the message on. It should be noted that such an implementation using JMS is used for exemplary purposes only. The system and method of scope monitoring and tracking may be implemented in any number of programming languages and/or environments.

Because the call made by the source component 410 to the target component 412 is an asynchronous call, the call is intercepted at another interception point in addition to the pre-invoke and post-invoke interception points. The call is initially intercepted prior to being delivered to the JMS queue 414. This interception point 418, also called pre-dispatch. By intercepting the call from the source component 410 at the pre-dispatch interception point 418, the initial scope of the source component 410 can be determined. In the example shown in FIG. 4A, the source component 410 is not within a scope. Therefore, in one aspect, the initial scope of the source component 410 is null. After the call is processed by the MDB 416, the call is again intercepted at pre-invoke interception point 420. By intercepting the call at the pre-invoke interception point, the scope declaration specified by the target component 412 can be determined. In this case, the scope declaration specified by the target component 412 is of type Supports or NotSupported. Based on the fact that the initial scope of the source component 410 is null, and the scope specified by the target component 412 is of type Supports or NotSupported, it can be determined that there will be no change in scope, and that the target component 412 will not be within a scope. Therefore, it is not necessary to create a database record indication the presence of a new scope because there is no change in scope, and no scope present. Once the target component 412 is finished executing, execution is returned to the source component 410. A return call is further intercepted at post-invoke interception point 422. No action is taken as a result of the interception at post-invoke interception point 422 because there is no scope, and no change in scope.

Figure 4B:
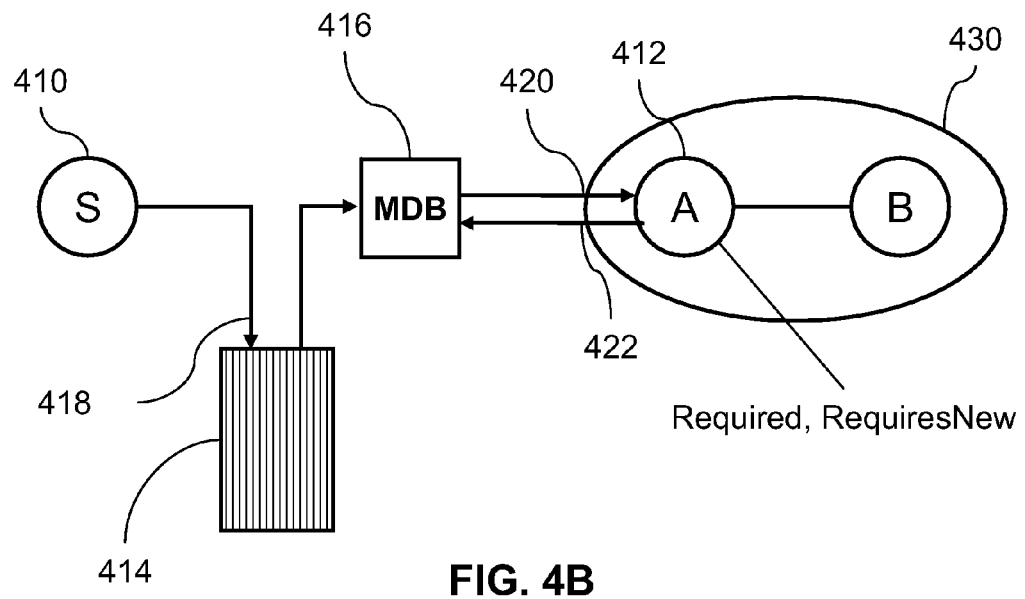
FIG. 4B illustrates a situation where a source component is not in any scope, and makes an asynchronous call to invoke to a target component having a scope declaration of type Required or RequiresNew.

FIG. 4B illustrates a situation where a source component 410 is not in any scope, and makes an asynchronous call to invoke to a target component 412 having a scope declaration of type Required or RequiresNew. The initial scope of the source component 410 is determined by intercepting the call made by the source component 410 at pre-dispatch interception point 418, prior to being delivered to the JMS queue 414.

From the interception made at pre-dispatch, it is determined that the initial scope of the source component 410 is null. After leaving the JMS queue 414, the call is again intercepted at pre-invoke interception point 420, where it is determined that the scope declaration specified by the target component 412 is of type Required, or RequiresNew. A scope declaration of types Required or RequiresNew involves creation of a new scope when the source component 410 is not already within a scope. Therefore, a new scope 430 is created. An entry is created in a database indicating the presence of a new scope 430. The database entry may for example identify the new scope 430 using a unique identifier such as ScopeID. Furthermore, the database entry may identify one or more components participating in the scope. Therefore, in this case, the database entry specifies that target component 412 is participating in scope 430.

After the target component 412 has finished executing, a return call is sent to the source component 410, and is intercepted at post-invoke interception point 422, where it is determined that execution of the target component 412 has completed and the target component 412 has left scope 430. A check is made to determine if scope 430 is empty, or if there are other components within scope 430. If scope 430 is determined to be empty, then scope 430 is removed. If other components are participating within scope 430, the scope is not removed. This check can be performed querying the database to see if there are entries matching the ScopeID, and having other participants. If the scope is removed, the database is updated accordingly. In one aspect, the previously created database entry identifying scope and participant is deleted.

Figure 4C:
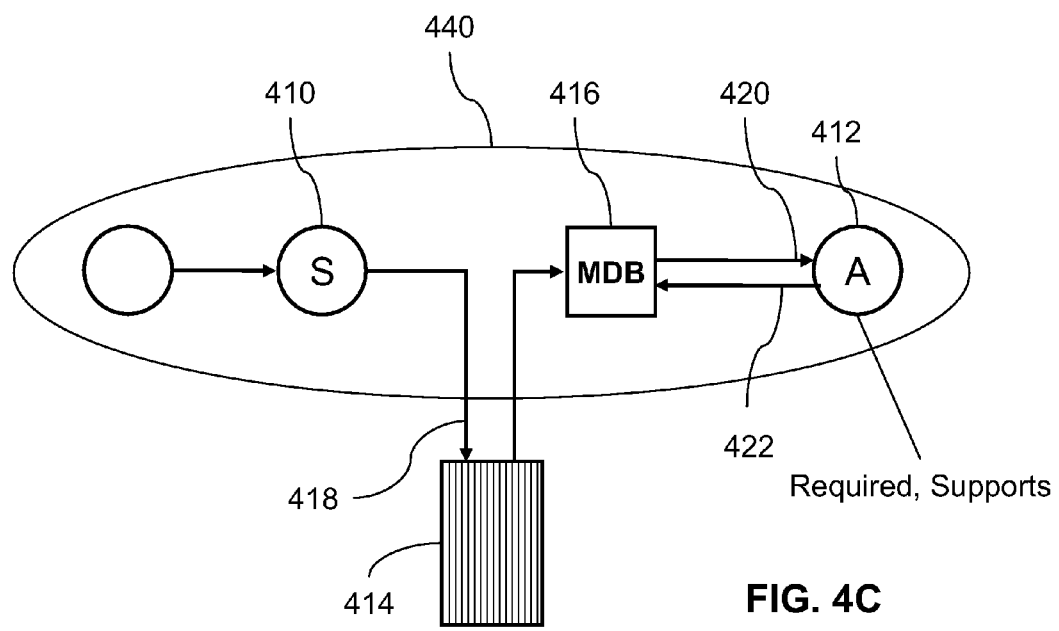
FIG. 4C illustrates a situation where a source component is initially in a scope, and makes an asynchronous call to invoke a target component having a scope declaration of type Required or Supports.

FIG. 4C illustrates a situation where a source component 410 is initially in a scope, and makes an asynchronous call to invoke a target component 412 having a scope declaration of type Required or Supports. The initial scope of the source component 410 is determined by intercepting the call made by the source component 410 at pre-dispatch interception point 418, prior to being delivered to the JMS queue 414. From the interception made at pre-dispatch, it is determined that the source component 410 is already within scope 440.

For asynchronous calls, when it is determined that the source component is already within a scope, a marker is created to ensure that the scope is not removed. In one aspect, the marker is created by listing the target component a "phantom participant" in the scope. This may be accomplished by creating or updating the scope tracking database with an entry to indicate that target component is a phantom participant in the initial source scope. The target component is listed as a phantom participant, meaning that in reality the target component is not actually a participant in the initial source scope. Listing the target component as a phantom participant provides a temporary marker, such that the initial scope of the source component 410 is prevented from being removed. Once a determination is made regarding whether or not the target component will actually join the scope after the thread switch, the phantom participant entry is updated accordingly.

Once the scope declaration of the target component is determined, the target component may actually join the scope. If this should be the case, the phantom participant is removed, and the target component is listed as a real participant in the scope. In one aspect, this is accomplished by updating the database entry listing the target component as a phantom participant to indicate the target component is now a real participant. In another aspect, the database entry listing the target component as a phantom participant is deleted, and a new entry is created listing the target component as a real participant. If the target component does not actually join the scope, then the target component's listing as a phantom participant is removed from the database entry. Creating a marker by listing the target component is a phantom participant is simply a way to prevent the initial scope of the source component from being removed.

A component may be indicated to be a phantom participant in any number of ways. In one aspect, an additional field may be provided to indicate the presence of a phantom participant. The additional field can be toggled, to indicate whether the component listed is a phantom participant or a real participant in the scope. For example, a null value in this field might mean that the participant is a real participant, while a positive value inserted into the field indicates that the component listed as a participant is actually a phantom participant.

Therefore, referring back to FIG. 4C, the scope tracking database is updated at pre-dispatch interception point 418 to indicate that target component 412 is now a phantom participant in scope 440, to ensure that scope 440 is not removed after the thread switch. After leaving the JMS queue 414, the call is again intercepted at pre-invoke interception point 420, where it is determined that the scope declaration specified by the target component 412 is of type Required, or Supports. A scope declaration of types Required or Supports involves joining or participating in the existing scope assuming the source component 410 is already within a scope. Therefore, target component 412 joins existing scope 440. As a result, the scope tracking database is updated to reflect that the target component 412 is no longer a phantom participant but an actual participant of scope 440.

After the target component 412 has finished executing, the target component 412 leaves scope 440. A return call is intercepted at post-invoke interception point 422, where it is determined that execution of the target component 412 has completed. The database is updated to indicate that target component 412 is no longer a participant in scope 440. Target component 412 is removed from scope 440. Scope 440 is now removed if it is determined to be empty. If scope 440 is removed, the database is updated accordingly to indicate that scope 440 no longer exists. If other components are participating within scope 440, the scope is not removed.

Figure 4D:
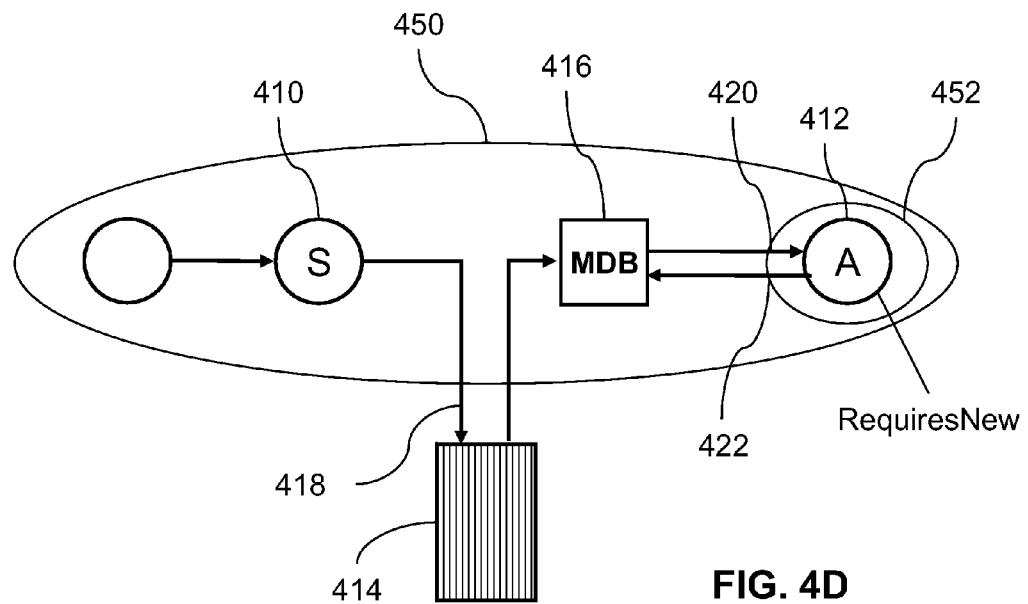
FIG. 4D illustrates a situation where a source component is initially in a scope, and makes an asynchronous call to invoke a target component having a scope declaration of type RequiresNew.

FIG. 4D illustrates a situation where a source component 410 is initially in a scope, and makes an asynchronous call to invoke a target component 412 having a scope declaration of type RequiresNew. The initial scope of the source component 410 is determined by intercepting the call made by the source component 410 at pre-dispatch interception point 418, prior to being delivered to the JMS queue 414. From the interception made at pre-dispatch, it is determined that the source component 410 is already within scope 450. Therefore, the scope tracking database is updated to list target component 412 as a phantom participant in scope 450 to ensure that scope 450 is not removed. After leaving the JMS queue 414, the call is again intercepted at pre-invoke interception point 420, where it is determined that the scope declaration specified by the target component 412 is of type RequiresNew. A scope declaration of type RequiresNew involves creating a new, nested scope within the existing scope, assuming the source component 410 is already within a scope. Therefore, a new nested scope 452 is created within scope 450. The scope tracking database is accordingly updated to remove the target component 412 as a phantom participant within scope 450. A new database entry is created in the scope tracking database indicating that a new scope 452 has been created, and target component 412 is now within the new scope 452. After the target component 412 has finished executing, execution is returned to the source component 410. The return call is intercepted at post-invoke interception point 422, where it is determined that execution of the target component 412 has completed and target component 412 should be removed from scope 452. Therefore, the database is updated to indication that target component 412 is no longer a participant in scope 452. Next, scope 452 is removed if it is determined to be empty. If the scope is removed, the database is updated accordingly to indicate that scope 452 no longer exists. If other components are participating within scope 452, the scope is not removed. Furthermore, an update is made to the database to indicate that the parent scope no longer has a child scope. In the case of nested scopes, the parent is also analyzed to determine if it is empty. In this case, the parent scope is scope 450. Therefore, if scope 450 is determined to be empty, scope 450 is removed, and the database is updated accordingly.

Figure 4E:
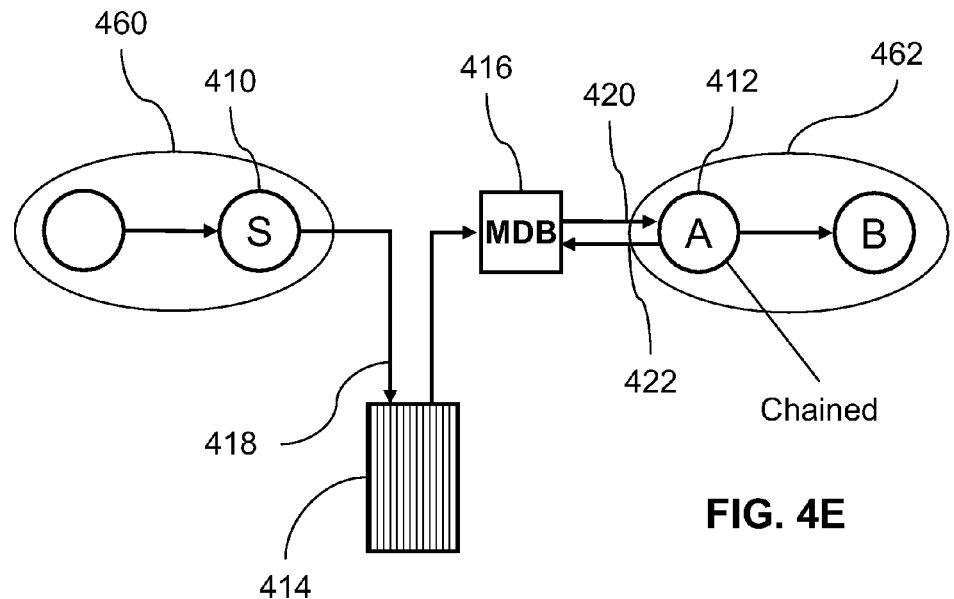
FIG. 4E illustrates a situation where a source component is initially in a scope, and makes an asynchronous call to invoke a target component having a scope declaration of type Chained.

FIG. 4E illustrates a situation where a source component 410 is initially in a scope, and makes an asynchronous call to invoke a target component 412 having a scope declaration of type Chained. The initial scope of the source component 410 is determined by intercepting the call made by the source component 410 at pre-dispatch interception point 418, prior to being delivered to the JMS queue 414. From the interception made at pre-dispatch, it is determined that the source component 410 is already within scope 460. Therefore, target component 412 is listed as a phantom participant in scope 460 to ensure that scope 460 is not removed. After leaving the JMS queue 414, the call is again intercepted at pre-invoke interception point 420, where it is determined that the scope declaration specified by the target component 412 is of type Chained. A scope declaration of type Chained involves creating a new scope separate from the existing scope, assuming there is an existing scope. Therefore, a new scope 462 is created. The entry indicated target component 412 as a phantom participant in scope 460 is now removed. A new entry is created in the scope tracking database indicating that a new scope 462 has been created, and target component 412 is now a participant in new scope 462. After the target component 412 has finished executing, execution is returned to the source component 410. The return call is intercepted at post-invoke interception point 422, where it is determined that execution of the target component 412 has completed and the target component 412 should be removed from scope 462. The database is updated to indicate that target component 412 is no longer a participant of scope 462. Scope 462 is removed if it is determined to be empty. If the scope is removed, the database is updated accordingly to indicate that scope 462 no longer exists. If other components are participating within scope 462, the scope is not removed.

Figure 4F:
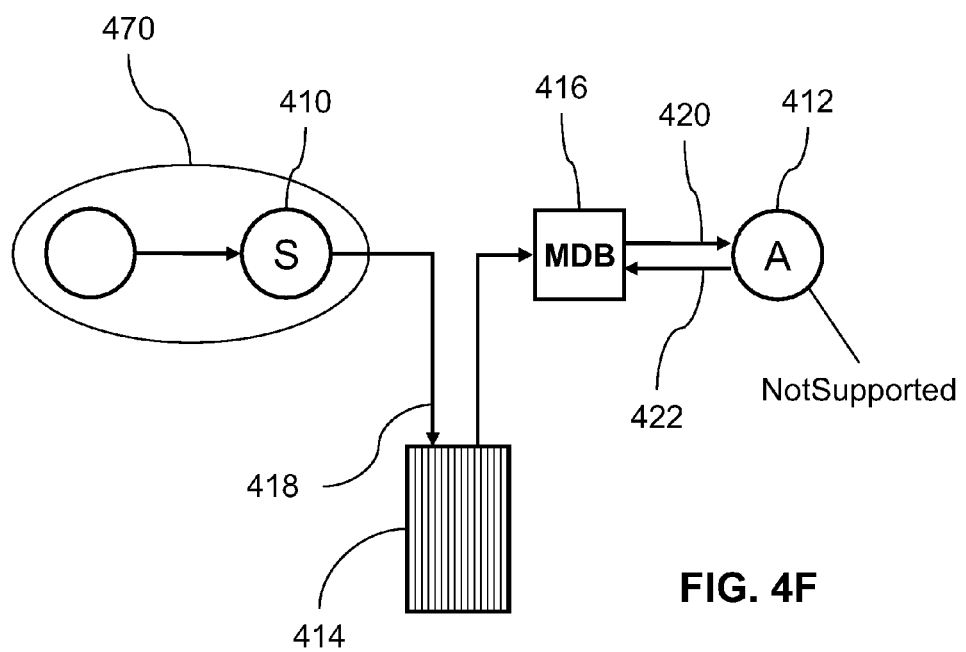
FIG. 4F illustrates a situation where a source component is initially in a scope, and makes an asynchronous call to invoke a target component having a scope declaration of type NotSupported.

FIG. 4F illustrates a situation where a source component 410 is initially in a scope, and makes an asynchronous call to invoke a target component 412 having a scope declaration of type NotSupported. The initial scope of the source component 410 is determined by intercepting the call made by the source component 410 at pre-dispatch interception point 418, prior to being delivered to the JMS queue 414. From the interception made at pre-dispatch, it is determined that the source component 410 is already within scope 470. Therefore, and entry is created in the scope tracking database to indicate that target component 412 is a phantom participant in scope 470. After leaving the JMS queue 414, the call is again intercepted at pre-invoke interception point 420, where it is determined that the scope declaration specified by the target component 412 is of type NotSupported. A scope declaration of types NotSupported involves leaving the existing scope, assuming the source component 410 is already within a scope. Accordingly, target component 412 is removed as a phantom participant in scope 470. Target component 412 is not within any scope. Scope 470 is removed if it is determined to be empty. In one aspect, no further database entry is required because there is no scope to track.

Figure 5:
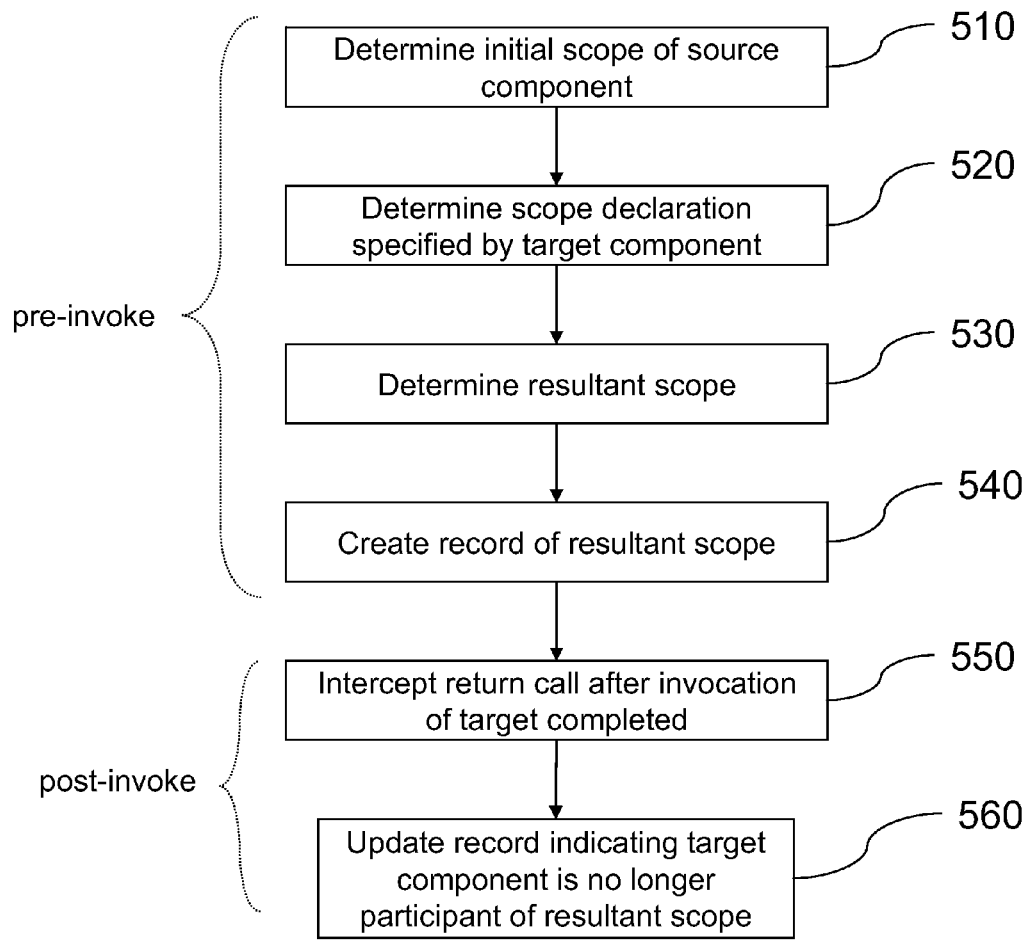
FIG. 5 is a flow diagram of a method for tracking scopes for synchronous calls in accordance with one aspect of the present disclosure.

FIG. 5 illustrates a block flow diagram of the steps involved in tracking scopes for synchronous calls. A synchronous call from a source component to invoke a target component is initially intercepted prior to invocation of the target component. At this interception point, data within the call is analyzed to determine what the initial scope of the source component, in addition to the scope declaration specified by the target component. Therefore, as indicated at step 510, the initial scope of the source component is determined. Furthermore, as indicated by step 520, the scope declaration of the target component is determined at pre-invoke. Based on these two values, the subsequent scope present upon invocation of the target component can be determined. At step 530, the resultant scope present upon invocation of the target component is determined. At step 540, a record is created to indicate the resultant scope of the target component. For example, if a new scope is created, a database entry is created indicating the new scope. If the target component joins an existing scope, a database entry is made to indicate that the target component is participating in the existing scope. If there is no scope present, there may be no need to create a database entry. After the target component has completed execution, execution is returned to the source component. As indicated by step 550, the return call is intercepted at post-invoke, indicating that the target component has completed its execution. The target component is removed as a participant from the resultant scope. An update to the record, indicating that the target component is no longer a participant in the resultant scope is made, as indicated at step 560. Furthermore, an analysis is performed to determine if the scope is empty. The scope is removed if it is determined to be empty.

Figure 6:
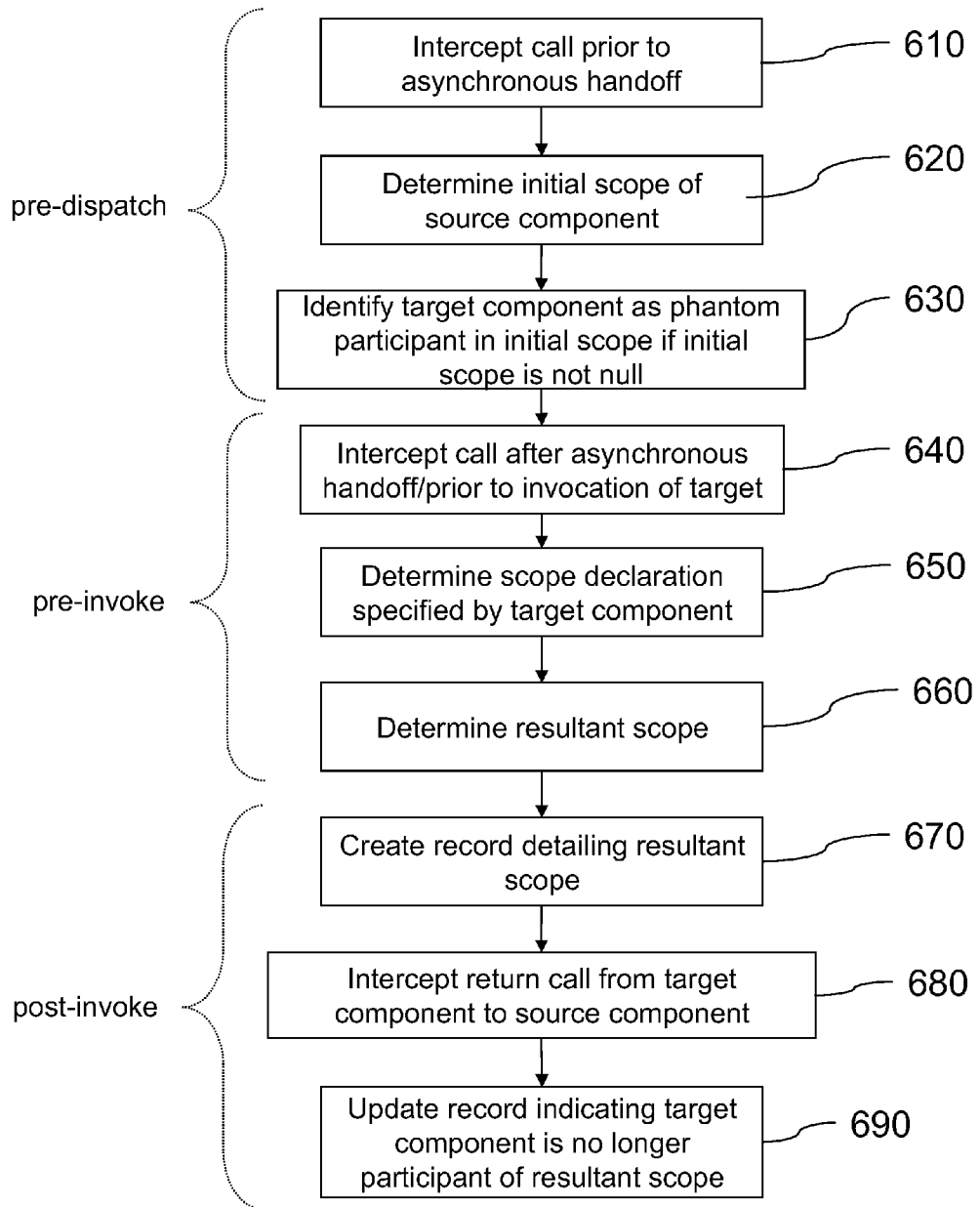
FIG. 6 is a flow diagram of a method for tracking scopes for asynchronous calls in accordance with one aspect of the present disclosure.

FIG. 6 illustrates a block flow diagram of the steps involved in tracking scopes for asynchronous calls. The call made by the source component is intercepted at a pre-dispatch interception point, prior to asynchronous handoff, as indicated at step 610. At the pre-dispatch interception point, the initial scope of the source component is determined as indicated by step 620. For asynchronous calls, if the source component is determined to be within a scope (initial scope is not null), the a marker is created to prevent the initial scope from being removed. Therefore, as indicated by step 630, a record is created identifying the target component as a phantom participant in the initial scope. After the asynchronous handoff occurs, the call is again intercepted at a pre-invoke interception point, as indicated at step 640. In step 650, the type of scope declaration specified by the target component is determined by analyzing data found within the call at the pre-invoke interception point. At step 660, the subsequent or resulting scope present upon invocation of the target component is determined. At step 660, a record is created to indicate the resultant scope of the target component. For example, if a new scope is created, a database entry is created indicating the new scope. If the target component joins an existing scope, a database entry is made to indicate that the target component is participating in the existing scope. If there is no scope present, there may be no need to create a database entry. After the target component 412 has completed execution, execution is returned to the source component 410. As indicated by step 680, the return call is intercepted at post-invoke, indicating that the target component has completed its execution, and that the target component should be removed as a participant in scope. If the scope present upon invocation of the target component is empty, it is removed. An update to the database, indicating that the scope was removed may be necessary, as indicated at step 690.

Figure 7:
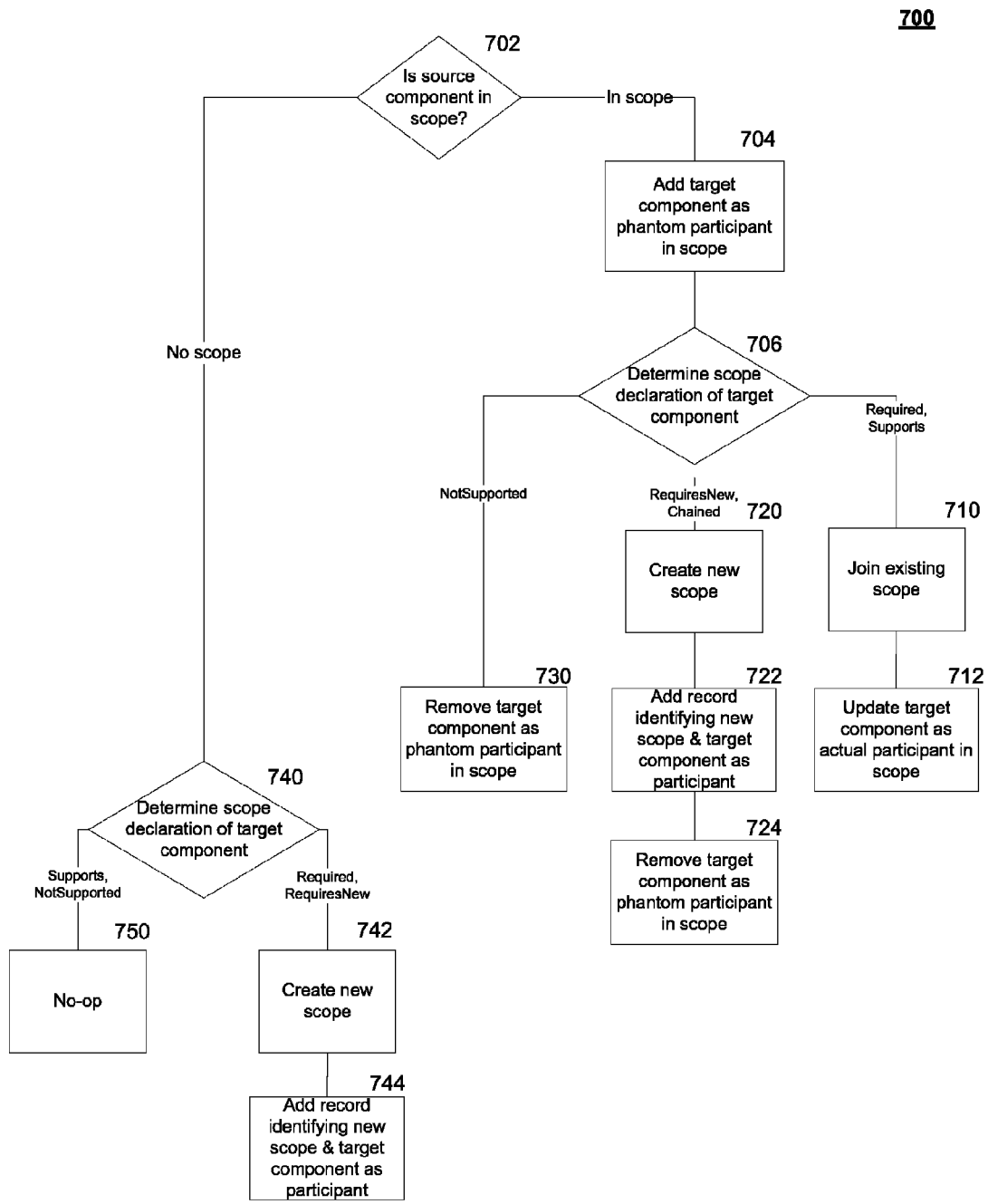
FIG. 7 is a block flow diagram of a method for tracking scopes for asynchronous calls in accordance with one aspect of the present disclosure.

FIG. 7 is a block flow diagram of the process performed for tracking scopes in asynchronous invocations. At decision block 702, a determination is made regarding whether the source component is in a scope. As discussed earlier, for asynchronous invocations, if the source component is already in a scope, an entry is created in the database or other centralized storage used for tracking scopes, identifying the target component to be a phantom participant in the initial scope. This is done so that the initial scope is prevented from being removed upon a switch in threads. Therefore, if the source component is determined to be in a scope at 702, processing proceeds to block 704 where the target component is added as a phantom participant in the initial scope. The steps of determining the scope of the source component 702, and adding the target component as a phantom participant in the initial scope 704 occur at pre-dispatch, or prior to the asynchronous handoff, where a thread switch occurs. After the asynchronous handoff, or at pre-invoke, the scope declaration of the target component is determined, as indicated at decision block 706. If the scope declaration specified by the target component is determined to be of type Required or Supports, processing proceeds to block 710, where the target component joins the existing scope, or initial scope of the source component. The entry identifying the target component as a phantom participant in the initial scope need only be changed to reflect that the target component is now an actual participant in the initial scope. Therefore, the entry previously created in the scope tracking database listing the target component as a phantom participant in the initial scope is updated to reflect that the target component is now an actual participant, as indicated at block 712.

Referring back to decision block 706, if the scope declaration specified by the target component is determined to be of type RequiresNew or Chained, processing proceeds to block 720. Scopes of type RequiresNew and Chained involve starting a new scope. Therefore, a new scope is created as indicated by block 720. A new entry is now created to indicate the presence of the newly created scope, and listing the target component as a participant in the newly created scope, as shown at block 722. In this case, because target component intends to join a newly created scope, the previous entry listing target component as a phantom participant in the initial scope is now removed, as indicated at block 724.

In the case where the scope declaration specified by the target component is of type NotSupported, assuming the source component was already in a scope, processing proceeds from decision block 706 to block 730. Because a scope of type NotSupported involves leaving the already existing scope, the previous entry indicating target component as a phantom participant in the initial scope is removed. The target component is not within a scope, and therefore there is no need to create a database entry.

Referring back to initial decision block 702, if it determined that the source component is not within any scope, processing proceeds to decision block 740, where the scope declaration specified by the target component is determined. There is no need to create an entry indicating a phantom participant in this case because there is no scope present to prevent from being removed. If the scope declaration specified by the target component is determined to be of type Required, or RequiredNew, a new scope is created, as indicated at block 742. A record is created identifying the newly created scope and listing the target component as a participant in the newly created scope, as indicated at block 744. If it is determined the scope declaration specified by the target component is of type Supports or NotSupported, no operation is performed, as indicated at block 750. The target component remains in no scope.

Figure 8:
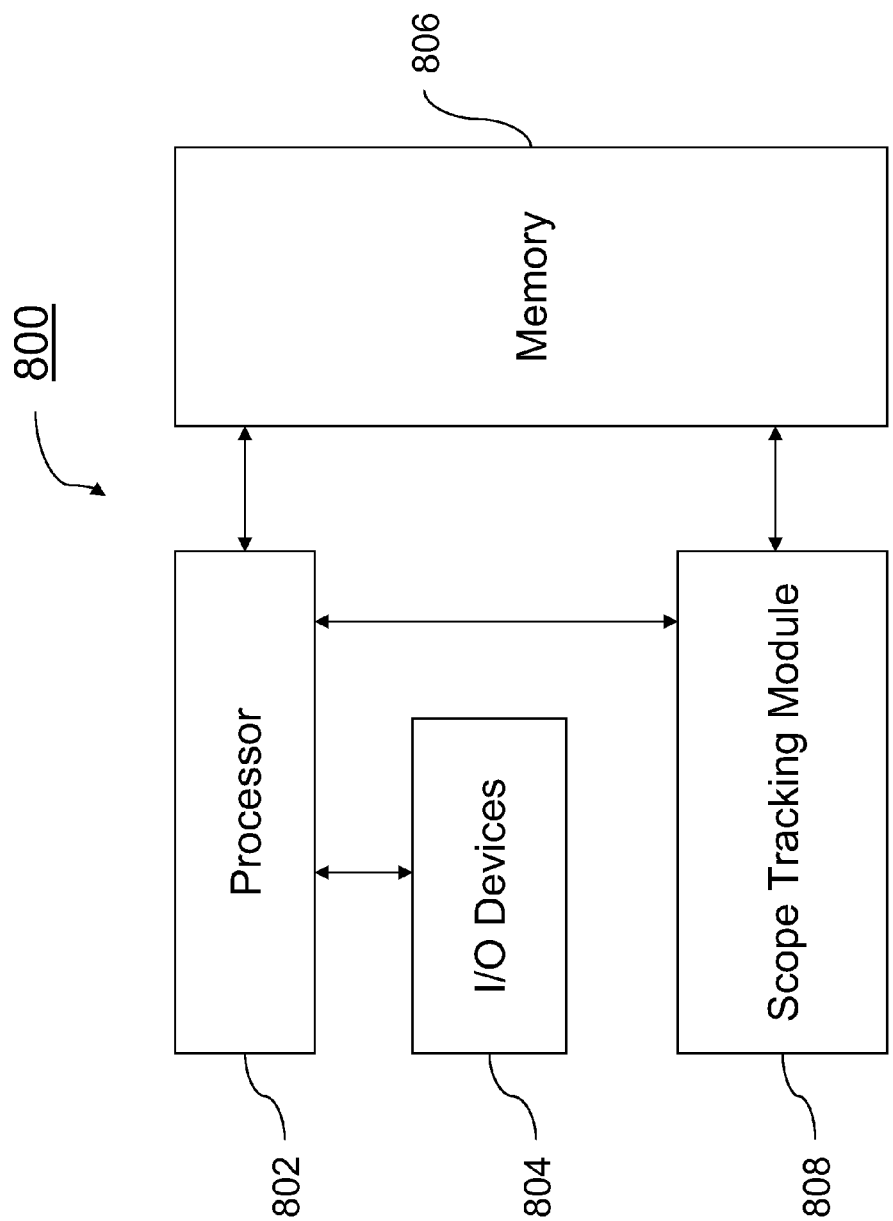
FIG. 8 is a block diagram of a system utilizing a scope monitoring module in accordance with one aspect of the present disclosure.

FIG. 8 illustrates a block diagram of a system 800 that utilizes a scope tracking module. In one embodiment, the system 800 is suitable for storing and/or executing program code and is implemented using a general purpose computer or any other hardware equivalents. Thus, the system 800 comprises a processor 802, a memory 806, e.g., random access memory ("RAM") and/or read only memory ("ROM"), a scope tracking module 808, and various I/O devices 804.

The processor 802 is coupled, either directly or indirectly, to the memory 806 through a system bus. The memory 806 can include local memory employed during actual execution of the program code, bulk storage, and/or cache memories which provide temporary storage of at least some program code in order to reduce the number of times code must be retrieved from bulk storage during execution.

The I/O devices 804 can be coupled directly to the system 800 or through intervening input/output controllers. Further, the I/O devices 804 can include a keyboard, a keypad, a mouse, a microphone for capturing speech commands, a pointing device, and other user input devices that will be recognized by one of ordinary skill in the art. Further, the I/O devices 804 can include a receiver, transmitter, speaker, display, image capture sensor, biometric sensor, etc. In addition, the I/O devices 804 can include storage devices such as a tape drive, floppy drive, hard disk drive, compact disk ("CD") drive, etc.

Network adapters may also be coupled to the system 800 to enable the system 600 to become coupled to other systems, remote printers, or storage devices through intervening private or public networks. Modems, cable modems, and Ethernet cards are just a few of the currently available types of network adapters.

It should be understood that the method and system described herein can take the form of an entirely hardware embodiment, an entirely software embodiment, or an embodiment containing both hardware and software elements. If software is utilized to implement the method or system, the software can include, but is not limited to, firmware, resident software, microcode, etc.

Further, the method and/or system can take the form of a computer program product accessible from a computer-usable or computer-readable medium providing program code for use by or in connection with a computer or any instruction execution system. For the purpose of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a RAM, a ROM, a rigid magnetic disk and an optical disk. Current examples of optical disks include CD-read only memory ("CD-ROM"), CD-read/write ("CD-R/W") and DVD.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

IBM, WebSphere, and CrossWorlds are registered trademarks of International Business Machines Corporation in the United States, other countries, or both.

The invention claimed is:

1. A computer program product comprising a tangible computer useable storage medium having a computer readable program, wherein the computer readable program when executed on a computer causes the computer to:
    detect a call from a source component to invoke a target component;
    determine an initial scope of the source component, the initial scope being a scope associated with the source component prior to invocation of the target component, wherein the initial scope is determined prior to the call being delivered to asynchronous storage if the call is detected as an asynchronous call;
    determine a scope declaration specified by the target component;
    determine a resultant scope present upon invocation of the target component, the resultant scope being determined based on the initial scope of the source component and the scope declaration specified by the target component; and
    store a record in a centralized location, the record identifying the resultant scope, and the target component as a participant in the resultant scope.

2. The computer program product of claim 1 wherein the initial scope is determined by intercepting the call from the source component to the target component prior to invocation of the target component and analyzing a call context associated with the call.

3. The computer program product of claim 1 wherein the initial scope is determined by querying a database to determine a scope in which the source component is listed as a participant.

4. The computer program product of claim 1 wherein determining the scope declaration specified by the target component comprises intercepting the call from the source component to the target component prior to invocation of the target component and analyzing a call context associated with the call.

5. The computer program product of claim 1 wherein the computer readable program when executed on a computer further causes the computer to detect completion of invocation of the target component, and update the record to indicate the target component has been removed as a participant from the resultant scope.

6. The computer program product of claim 5 wherein completion of invocation of the target component is detected by intercepting a response from the target component to the source component.

7. The computer program product of claim 1 wherein the centralized location is a scope tracking database.

8. The computer program product of claim 1 wherein the computer readable program when executed on a computer further causes the computer to detect if the call is a synchronous call or an asynchronous call.

9. The computer program product of claim 1 wherein upon detecting the call is an asynchronous call and determining the initial scope is not null, a record is stored in the centralized location, the record identifying the target component as a phantom participant in the initial scope such that the initial scope is prevented from being removed.

10. A system comprising:
a processor;
a scope tracking database configured to store information regarding a scope and a component participating in the scope;
a scope tracking module configured, by the processor, to intercept a call from a source component in an initial scope to invoke a target component, wherein the initial scope is determined prior to the call being delivered to asynchronous storage if the call is detected as an asynchronous call, and to determine a resultant scope present upon invocation of the target component, the resultant scope being determined based upon the initial scope of the source component and a scope declaration specified by the target component, the scope tracking module further configured to insert data identifying the resultant scope and the target component participating in the resultant scope into a record in the scope tracking database.

11. The system of claim 10 wherein the scope resulting from invocation of the target component is a dynamic scope.

12. The system of claim 10 wherein the initial scope is determined by querying the scope tracking database to determine what scope the source component is a participant in.

13. The system of claim 10 wherein the scope tracking module is further configured to detect completion of invocation of the target component, and update the record to indicate the target component is no longer a participant in the resultant scope.

14. The system of claim 10 wherein the scope tracking module is further configured to detect if the call is an asynchronous call and to insert data identifying the target component as a phantom participant in the initial scope into a record in the scope tracking database such that the initial scope is prevented from being removed, if the call is determined to be an asynchronous call, and the initial scope is not null.

15. A computer program product comprising a tangible computer useable storage medium having a computer readable program, wherein the computer readable program when executed on a computer causes the computer to:
detect an asynchronous call from a source component to invoke a target component;
intercept the asynchronous call at a first interception point, the first interception point being prior to an asynchronous handoff;
determine an initial scope, the initial scope being a scope associated with the source component prior to invocation of the target component;
store a record in a centralized location, the first record identifying the initial scope, and the target component as a phantom participant in the initial scope upon determining the initial scope is not null;
intercept the asynchronous call at a second interception point, the second interception point being after the asynchronous handoff and prior to invocation of the target component;
analyze data at the second interception point to determine a scope declaration specified by the target component;
determine a resultant scope present upon invocation of the target component, the resultant scope being determined based on the scope of the source component and the scope declaration specified by the target component;
remove the record identifying the target component as being a phantom participant in the initial scope;
store a subsequent record identifying the resultant scope, and the target component as a participant in the resultant scope;
intercept a response from the target component to the source component after invocation of the target component has completed; and
update the subsequent record to indicate the target component is no longer a participant in the resultant scope.

16. The computer program product of claim 15 wherein the computer readable program when executed on a computer further causes the computer to remove the resultant scope if the resultant scope is determined to be empty.

17. The computer program product of claim 15 wherein the asynchronous handoff comprises a thread switch.

18. A method comprising:
detecting a call from a source component to invoke a target component;
determining an initial scope of the source component, the initial scope being a scope associated with the source component prior to invocation of the target component, wherein the initial scope is determined prior to the call being delivered to asynchronous storage if the call is detected as an asynchronous call;
determining a scope declaration specified by the target component;
determining a resultant scope present upon invocation of the target component, the resultant scope being determined based on the initial scope of the source component and the scope declaration specified by the target component; and
storing a record in a centralized location, the record identifying the resultant scope and the target component as a participant in the resultant scope.

19. The method of claim 18 wherein determining the initial scope comprises intercepting the call from the source component to the target component prior to invocation of the target component and analyzing a call context associated with the call.

20. The method of claim 18 wherein determining the initial scope comprises querying a database to determine what scope the source component is listed as a participant in.

21. The method of claim 18 wherein determining the scope declaration specified by the target component comprises intercepting the call from the source component to the target component prior to invocation of the target component and analyzing a call context associated with the call.

22. The method of claim 18 further comprising detecting completion of invocation of the target component, and updating the record to indicate the target component has been removed as a participant from the resultant scope.

23. A method comprising:
detecting an asynchronous call from a source component to invoke a target component;
intercepting the asynchronous call at a first interception point, the first interception point being prior to an asynchronous handoff;
determining an initial scope, the initial scope being a scope associated with the source component prior to invocation of the target component;
storing a record in a centralized location, the first record identifying the initial scope, and the target component as a phantom participant in the initial scope upon determining the initial scope is not null;
intercepting the asynchronous call at a second interception point, the second interception point being after the asynchronous handoff and prior to invocation of the target component;
analyzing data at the second interception point to determine a scope declaration specified by the target component;

determining a resultant scope present upon invocation of the target component, the resultant scope being determined based on the scope of the source component and the scope declaration specified by the target component;

storing a subsequent record identifying the resultant scope, and the target component as a participant in the resultant scope;

removing the record identifying the target component as being a phantom participant in the initial scope;

intercepting a return call from the target component to the source component after invocation of the target component has completed; and updating the subsequent record to indicate the target component is no longer a participant in the resultant scope.

\* \* \* \* \*